United States Patent
Naka

(10) Patent No.: US 11,285,687 B2
(45) Date of Patent: Mar. 29, 2022

(54) PRINTING APPARATUS AND METHOD OF CREATING PRINTED MATERIAL WHEN CONNECTING BAR CODE READER

(71) Applicant: BROTHER KOGYO KABUSHIKI KAISHA, Nagoya (JP)

(72) Inventor: Keishi Naka, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 171 days.

(21) Appl. No.: 16/575,342

(22) Filed: Sep. 18, 2019

(65) Prior Publication Data

US 2020/0094510 A1   Mar. 26, 2020

(30) Foreign Application Priority Data

Sep. 26, 2018   (JP) .............................. JP2018-180294

(51) Int. Cl.
| | |
|---|---|
| *G06K 7/10* | (2006.01) |
| *G06F 3/12* | (2006.01) |
| *B41J 3/407* | (2006.01) |
| *B31D 1/02* | (2006.01) |
| *G06K 15/02* | (2006.01) |

(52) U.S. Cl.
CPC .......... *B31D 1/027* (2013.01); *G06F 3/1236* (2013.01); *G06K 7/10* (2013.01); *G06K 15/02* (2013.01)

(58) Field of Classification Search
CPC ............................... B41J 3/4075; G06K 7/10
See application file for complete search history.

(56) References Cited

U.S. PATENT DOCUMENTS

| | | | | |
|---|---|---|---|---|
| 4,746,932 A | * | 5/1988 | Sato .................... | B65C 11/0226 347/171 |
| 6,321,989 B1 | * | 11/2001 | Wilz, Sr. .............. | G02B 26/106 235/462.45 |
| 2012/0085818 A1 | * | 4/2012 | Williams ........... | G06K 7/10851 235/375 |
| 2017/0253027 A1 | | 9/2017 | Kanda et al. | |

FOREIGN PATENT DOCUMENTS

| | | | |
|---|---|---|---|
| JP | 2017040991 A | * | 2/2017 |
| JP | 2017-154345 A | | 9/2017 |

* cited by examiner

*Primary Examiner* — Daniel J Colilla
(74) *Attorney, Agent, or Firm* — Kenealy Vaidya LLP

(57) ABSTRACT

A printing apparatus includes: a conveyor configured to convey a printing medium; a printing device configured to perform printing on the printing medium conveyed by the conveyor; a connector configured to accept a connecting cable connectable to a code reader; a storage configured to store setting information indicating a setting of the code reader; and a controller configured to control the conveyor and the printing device. The controller being configured to execute a setting-code-printed-material creating processing in which the controller controls the conveyor and the printing device to create a setting-code printed material by printing a setting code corresponding to the setting information stored in the storage, on the printing medium.

17 Claims, 13 Drawing Sheets

FIG.11

| SETTING VALUE | PREFIX/SUFFIX |
|---|---|
| 1000 | CTRL 2 |
| 1001 | CTRL A |
| . . | . . |
| 1033 | ! |
| 1034 | " |
| 1035 | # |
| 1036 | $ |
| . . | . . |

PRINTING APPARATUS AND METHOD OF CREATING PRINTED MATERIAL WHEN CONNECTING BAR CODE READER

CROSS REFERENCE TO RELATED APPLICATION

The present application claims priority from Japanese Patent Application No. 2018-180294, which was filed on Sep. 26, 2018, the disclosure of which is herein incorporated by reference in its entirety.

BACKGROUND

The following disclosure relates to a printing apparatus configured to perform printing on a printing medium, and a method of creating the printing medium by the printing apparatus.

A printing apparatus controls a printing device to perform printing on a printing medium to form a printed material. For example, there is known a printing apparatus that is connected to a bar-code reader and obtains bar-code information read by the bar-code reader, to perform printing on a printing medium based on the obtained bar-code information.

SUMMARY

In the conventional printing apparatus, however, a user needs to make settings for a bar-code reader newly connected to the printing apparatus, in order for the printing apparatus and the bar-code reader to transfer information such as bar-code information. This setting operation is complicated and imposes a heavy burden on the user.

Accordingly, an aspect of the disclosure relates to a printing apparatus that facilitates a setting operation on a bar-code reader newly connected and to a method of creating a printing medium by the printing apparatus.

In one aspect of the disclosure, a printing apparatus includes: a conveyor configured to convey a printing medium; a printing device configured to perform printing on the printing medium conveyed by the conveyor; a connector configured to accept a connecting cable connectable to a code reader, such that the connecting cable is removable from the connector; a storage configured to store setting information indicating a setting of the code reader; and a controller configured to control the conveyor and the printing device. The controller is configured to execute a setting-code-printed-material creating processing in which the controller controls the conveyor and the printing device to create a setting-code printed material by printing a setting code corresponding to the setting information stored in the storage, on the printing medium.

Another aspect of the disclosure relates to a method of creating a printed material by a printing apparatus. The printing apparatus includes (i) a conveyor configured to convey a printing medium, (ii) a printing device configured to perform printing on the printing medium conveyed by the conveyor, (iii) a connector configured to accept a connecting cable connectable to a code reader, such that the connecting cable is removable from the connector, and (iv) a storage configured to store setting information indicating a setting of the code reader. The method includes creating a setting-code printed material by printing a setting code corresponding to the setting information stored in the storage, on the printing medium.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 11 is a view for explaining initial setting for the bar-code reader in the conventional technique;

EMBODIMENT

Figure 1:
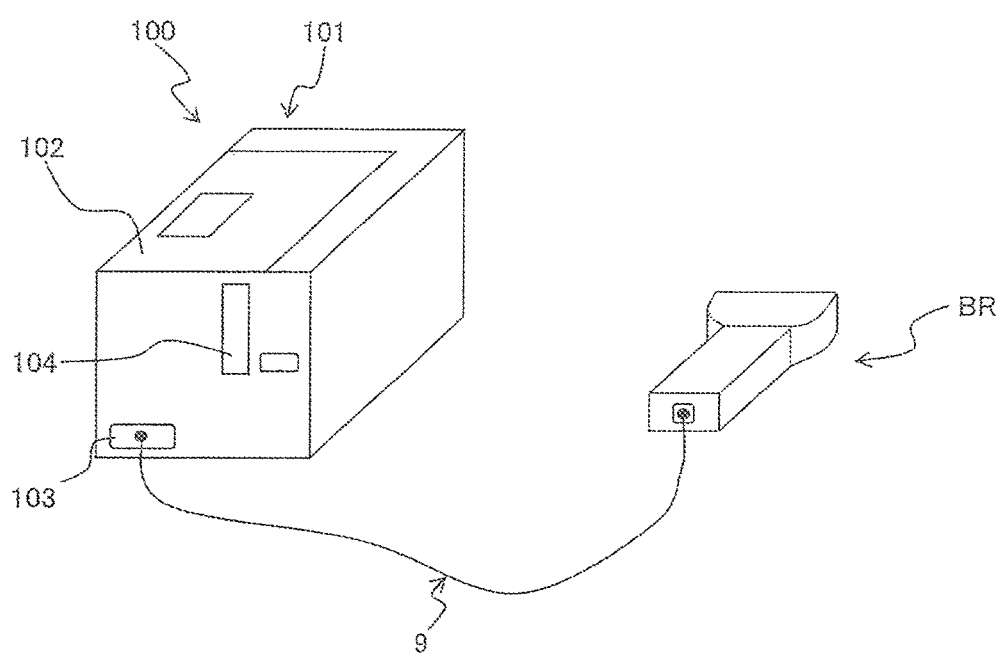
FIG. 1 is a schematic view of a label printer and a bar-code reader according to one embodiment.

Hereinafter, there will be described one embodiment by reference to the drawings. It is noted that the same reference numeral is used in this specification and drawings to designate elements having substantially the same function as a principle. Duplicated explanations for these elements are omitted as needed.

Overall Configuration in Embodiment

As illustrated in FIG. 1, a label printer 100 according to the present embodiment (as one example of a printing apparatus) includes a housing 101. An open/close cover 102 is provided on an upper surface of the housing 101 so as to be openable and closable or attachable and detachable. A front surface of the housing 101 has a tape output opening 104. The tape output opening 104 is an opening through which a printed-label tape 423 (see FIG. 3) created in the housing 101 is to be discharged to the outside of the housing 101.

The label printer 100 includes a USB (Universal Serial Bus) connector 103 (as one example of a connector) to and from which a USB cable 9 (as one example of a connecting cable) to be connected to a bar-code reader BR is insertable and removable. The bar-code reader BR may be connected to the label printer 10 by a wire different from the USB cable 9 in standard.

The bar-code reader BR is provided in a storage space for a plurality of cartridges 410 usable in the label printer 100 (e.g., a warehouse or a storeroom). The bar-code reader BR optically reads information from a bar code BC provided on each of the cartridges 410. The information read by the bar-code reader BR is transmitted to the label printer 100 via the USB cable 9. Examples of the information include a cartridge ID that is identification information on each of the cartridges 410, and type information representing the type of the cartridge).

Figure 2:
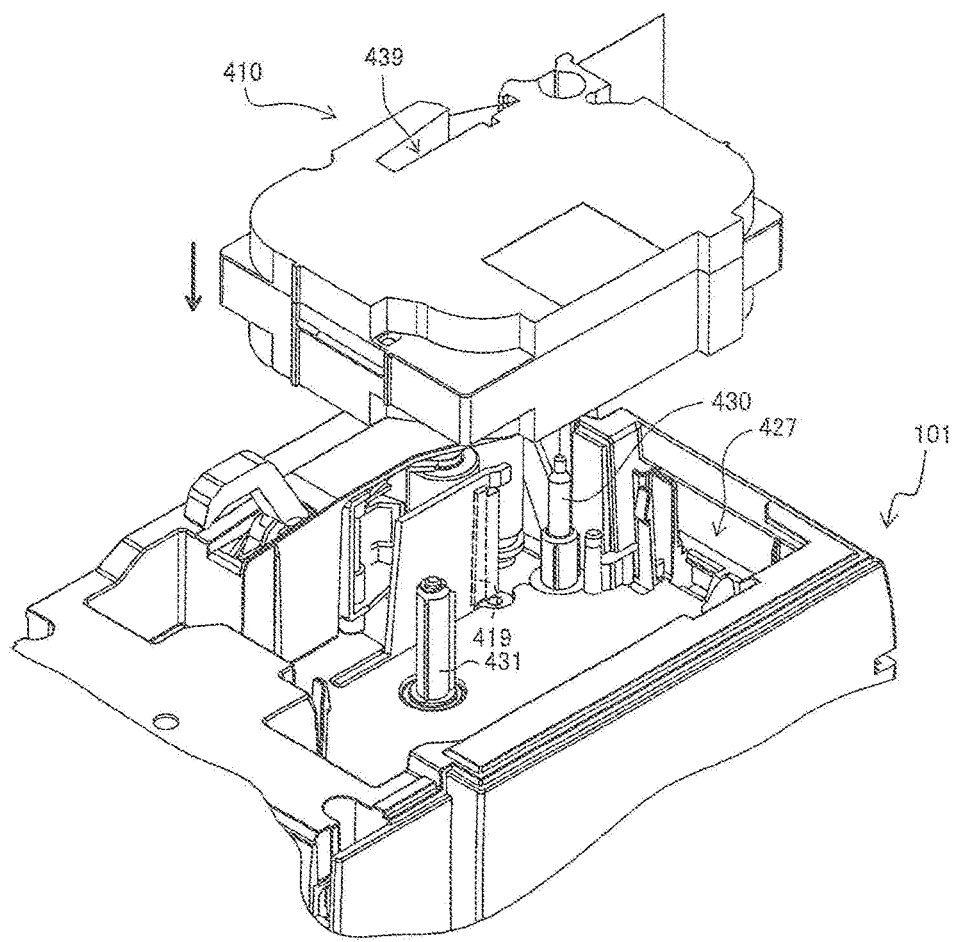
FIG. 2 is a perspective view illustrating the inside of a housing of the label printer.

FIG. 2 illustrates a cartridge holder 427 provided in the housing 101, and an external structure of the cartridge 410 to be mounted in the cartridge holder 427 in a state in which the open/close cover 102 of the label printer 100 is open. For simplicity, FIG. 2 omits illustration of the open/close cover 102 opening upward. Components around the cartridge holder 427 mounted on the cartridge 410 are illustrated in FIG. 3 with the cartridge 410.

Figure 3:
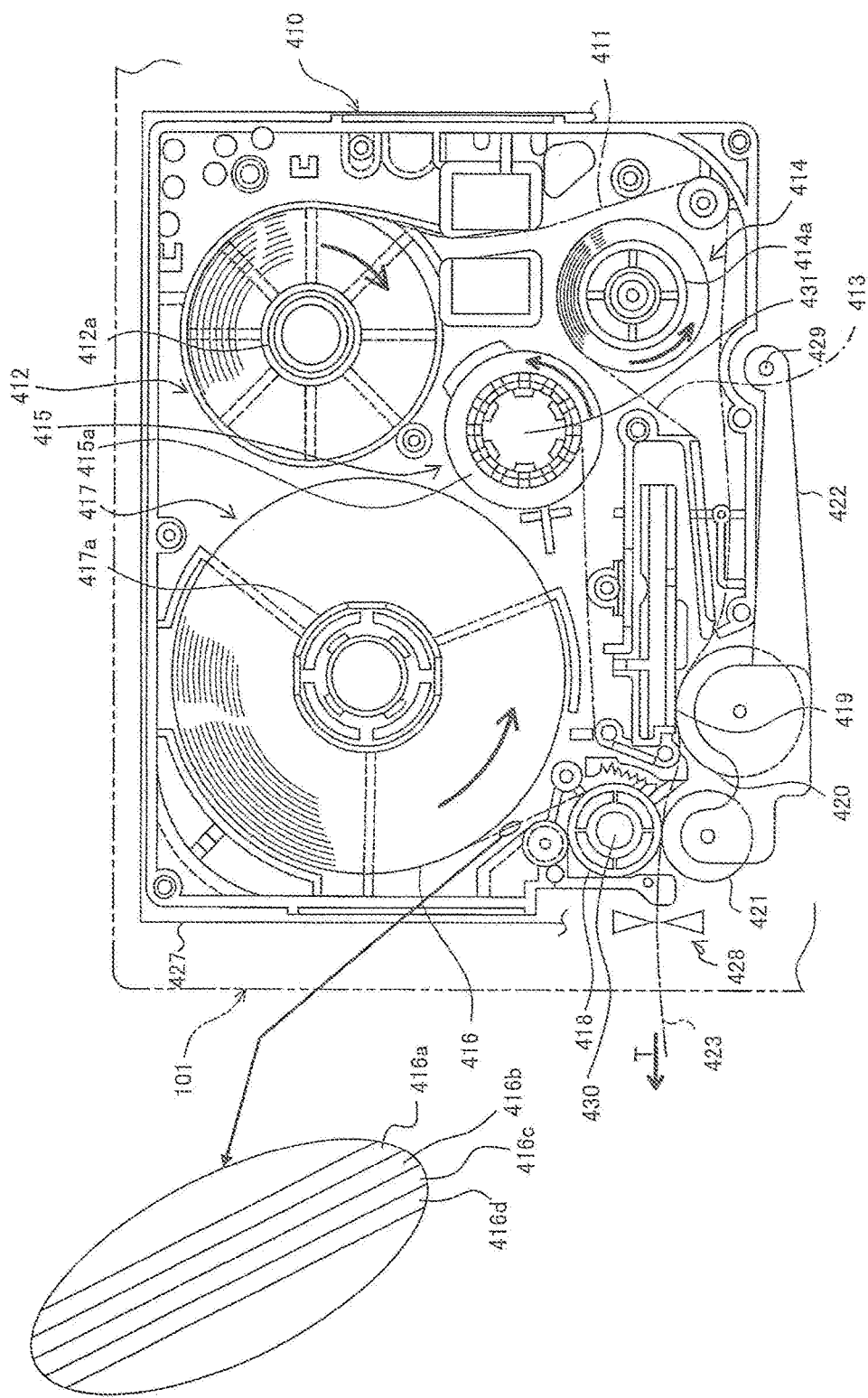
FIG. 3 is a view illustrating the inside of the housing of the label printer.

As illustrated in FIGS. 2 and 3, components provided in the housing 101 of the label printer 100 include: the cartridge holder 427 on and from which the cartridge 410 is mountable and removable; a print head 419 (as one example of a printing device); a tape-conveying-roller drive shaft 430 (as one example of a conveyor); and a ribbon-take-up-roller drive shaft 431. In this example, the cartridge 410 is shaped like a box having a substantially rectangular parallelepiped shape. A head-insertion opening 439 is formed through the cartridge 410 in its front and back direction.

The cartridge 410 includes: a substrate tape roll 417 that is a roll of a substrate tape 416; a cover-film roll 412 that is a roll of a cover film 411 (as one example of a printing medium); a ribbon-supply-side roll 414 that draws an ink ribbon 413 for printing; a ribbon-take-up roller 415 that takes up the ink ribbon 413 after printing; and a tape conveying roller 418. It is noted that the ribbon-supply-side roll 414 is unnecessary in the case where the printing medium is a thermal tape.

The substrate tape roll 417 is a roll of the substrate tape 416 wound around the substrate-tape spool 417a.

The substrate tape 416 has a plurality of layers (see a partial enlarged view in FIG. 3). In this example, the substrate tape 416 has four layers. That is, an adhesive layer 416a, a tape substrate layer 416b, an adhesive layer 416c, and a release paper sheet 416d are stacked on each other in this order in a direction directed from an inner side of the tape 416 (i.e., the right side in the partial enlarged view) toward an outer side of the tape 416 (i.e., the left side in the partial enlarged view). The adhesive layer 416a is formed of an adhesive to which the cover film 411 is to be stuck. The tape substrate layer 416b is formed of polyethylene terephthalate (PET), for example. The adhesive layer 416c is formed of an adhesive.

The release paper sheet 416d is peeled off from a finished printed label (see FIGS. 5 and 6) to stick the adhesive layer 416c to a sticking object such as a predetermined item.

The cover-film roll 412 is a roll of the cover film 411 wound around a cover-film spool 412a. In this example, the cover film 411 has the same width as that of the substrate tape 416. As descried above, the cover film 411 is one example of the printing medium. Examples of the printing medium include a film, a sheet, and a tape.

The ribbon-supply-side roll 414 is a roll of the ink ribbon 413 wound around a ribbon-supply-side spool 414a.

The ribbon-take-up roller 415 is provided with a ribbon-take-up spool 415a. The ribbon-take-up-roller drive shaft 431 provided on the cartridge holder 427 drives the ribbon-take-up roller 415 to take up the ink ribbon 413 having already been printed (used) and wind it around the ribbon-take-up spool 415a.

The tape-conveying-roller drive shaft 430 provided on the cartridge holder 427 drives the tape conveying roller 418 to press and stick the substrate tape 416 and the cover film 411 against and to each other to form the printed-label tape 423 while conveying the printed-label tape 423 in a direction indicated by arrow T in FIG. 3.

It is noted that the ribbon-take-up roller 415 and the tape conveying roller 418 are rotated in conjunction with each other when a driving force generated by a tape conveying motor 433 (see FIG. 4), e.g., a pulse motor, provided outside the cartridge 410 is transmitted to the ribbon-take-up-roller drive shaft 431 and the tape-conveying-roller drive shaft 430 via a gear mechanism, not illustrated.

The cartridge holder 427 includes the print head 419, the ribbon-take-up-roller drive shaft 431, the tape-conveying-roller drive shaft 430, and a roller holder 422.

The print head 419 includes a multiplicity of heating elements and performs printing on the cover film 411 drawn and conveyed from the cover-film roll 412.

The tape-conveying-roller drive shaft 430 drives the tape conveying roller 418 to convey (i) the cover film 411 drawn (supplied) from the cover-film roll 412 in the cartridge 410 mounted in the cartridge holder 427 and (ii) the substrate tape 416 drawn from the substrate tape roll 417.

The roller holder 422 is pivotably supported by a support shaft 429, enabling a switching mechanism to switch the roller holder 422 between a printing position and a release position. A platen roller 420 and a tape pressing roller 421 are rotatably provided on the roller holder 422. When the roller holder 422 is moved to the printing position, the platen roller 420 and the tape pressing roller 421 are brought into pressing contact with the print head 419 and the tape conveying roller 418.

A cutter 428 is provided on the cartridge holder 427 at a position adjacent to an output opening, not illustrated, of the cartridge 410. This cutter 428 is operated by exciting a solenoid 435 (see FIG. 4) to cut the printed-label tape 423 across it in its thickness direction to create a printed label L which will be described below (see FIG. 5).

Figure 4:
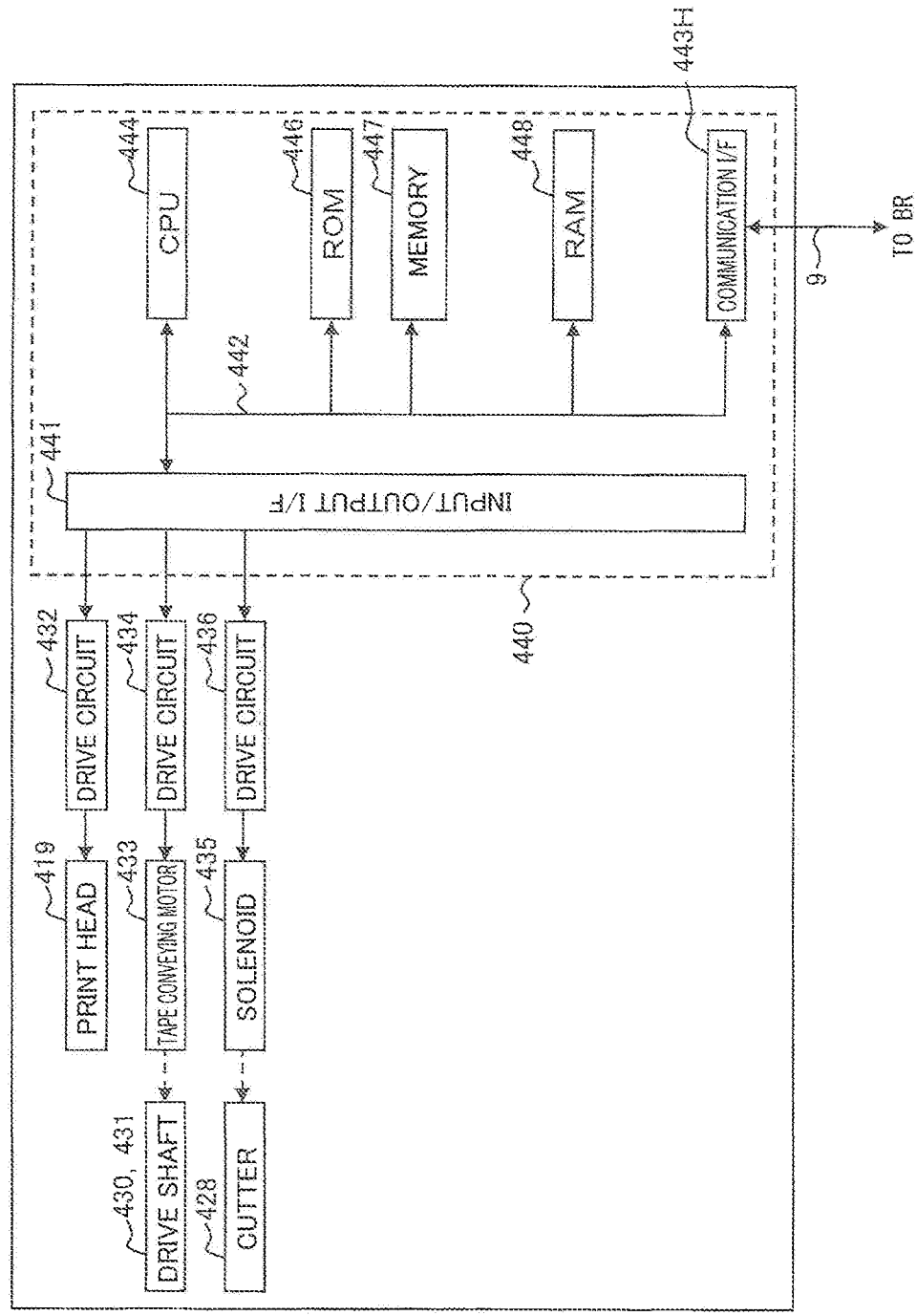
FIG. 4 is a block diagram representing a functional configuration of the label printer.

After the cartridge 410 is mounted on the cartridge holder 427, the ribbon-take-up-roller drive shaft 431 and the tape-conveying-roller drive shaft 430 are rotated in synchronization with each other by the driving force generated by the tape conveying motor 433 (see FIG. 4). When the tape-conveying-roller drive shaft 430 is driven, the tape conveying roller 418, the platen roller 420, and the tape pressing roller 421 are rotated to draw the substrate tape 416 from the substrate tape roll 417 and supply the substrate tape 416 to the tape conveying roller 418 as described above. The cover film 411 is drawn from the cover-film roll 412, and the heating elements of the print head 419 are energized by a print-head drive circuit 432 (see FIG. 5). During this operation, the ink ribbon 413 is brought into pressing contact with the print head 419 and thereby brought into contact with a back surface of the cover film 411. As a result, desired characters (mirror-image characters) are printed at a predetermined print region on the back surface of the cover film 411. The substrate tape 416 and the printed cover film 411 are stuck together as the printed-label tape 423 by the tape conveying roller 418 and the tape pressing roller 421 and conveyed to the outside of the cartridge 410. The cutter 428 cuts the printed-label tape 423 to create the printed label L (as one example of a printed material) on which desired characters are printed. It is noted that examples of the characters include letters, signs, marks, a text, an image, and so on.

Functional Configuration in Embodiment

As illustrated in FIG. 4, the label printer 100 includes a control circuit 440 (as one example of a controller) provided on a control board, not illustrated. The control circuit 440 controls the tape-conveying-roller drive shaft 430 and the print head 419, for example.

The control circuit 440 is provided with a CPU 444. Devices connected to the CPU 444 via a data bus 442 includes an input/output interface 441, a ROM 446, a memory 447 (as one example of a storage), a RAM 448, and a communication interface 443H. The communication interface 443H is connected to the bar-code reader BR via by the USB cable 9 connected to the USB connector 103.

The ROM 446 stores various programs required for control. The programs include a print-processing program for execution of a control procedure in FIG. 12 which will be described below). The CPU 444 executes processings according to the programs stored in the ROM 446. The RAM 448 temporarily stores information such as results of the processings executed by the CPU 444. The memory 447 stores various kinds of setting information required for control. Specifically, the memory 447 in the present embodiment stores predetermined setting information for the bar-code reader BR.

Devices connected to the input/output interface 441 include: the print-head drive circuit 432 for driving the print head 419; a tape-conveying-motor drive circuit 434; and a solenoid drive circuit 436 for driving the solenoid 435.

The tape-conveying-motor drive circuit 434 drives the tape conveying motor 433 to drive the tape-conveying-roller drive shaft 430 and the ribbon-take-up-roller drive shaft 431 to convey the substrate tape 416, the cover film 411, and the printed-label tape 423.

The solenoid drive circuit 436 excites the solenoid 435 to drive the cutter 428 to perform a cutting operation.

Example of Printed Label

Figure 5:
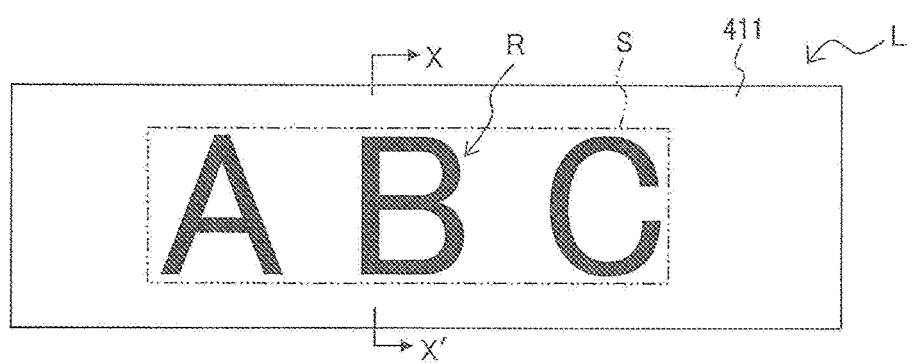
FIG. 5 is a plan view illustrating one example of a printed label formed by the label printer.
Figure 6:
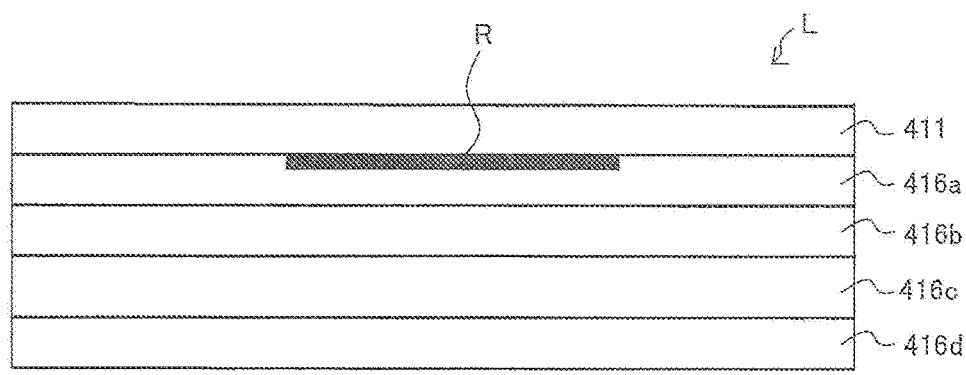
FIG. 6 is a cross-sectional view illustrating the printed label formed by the label printer.

There will be next described, with reference to FIGS. 5 and 6, one example of the printed label L formed by the label printer 100 by cutting the printed-label tape 423 as described above.

In FIGS. 5 and 6, the printed label L has five layers including the cover film 411 in addition to the above-described four layers illustrated in FIG. 3. That is, the cover film 411, the adhesive layer 416a, the tape substrate layer 416b, the adhesive layer 416c, and the release paper sheet 416d are arranged in this order in a direction directed from the upper side in FIG. 6 toward the lower side in FIG. 6. Desired characters R (as one example of a print object) are printed at a print region S on the back surface of the cover film 411. In this example, characters "ABC" are printed.

Situation in Replacement of Bar-Code Reader

There will be described, with reference to FIGS. 7A-11, a situation in replacement of the bar-code reader for easy understanding of operations and effects of the label printer according to the present embodiment, for example.

Figure 7A:
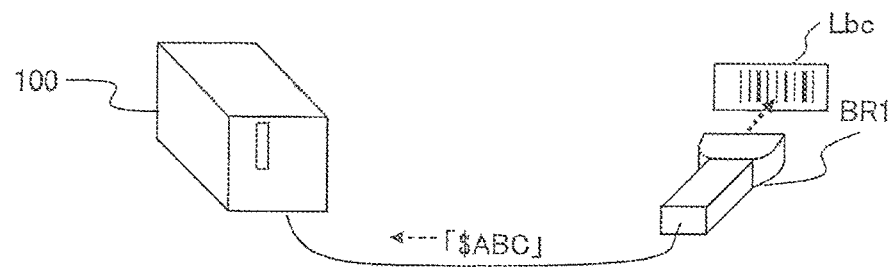
FIGS. 7A through 7D are views for explaining a printing operation by the label printer using the bar-code reader.
Figure 7B:
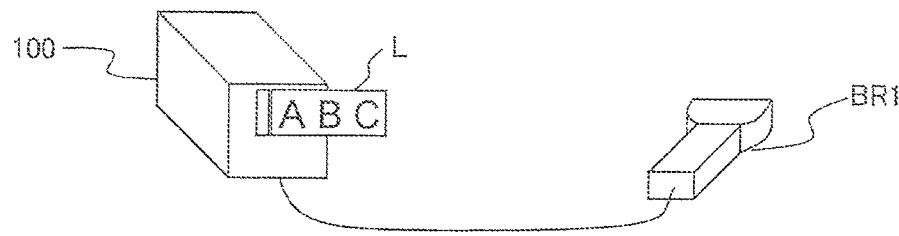
Figure 7C:
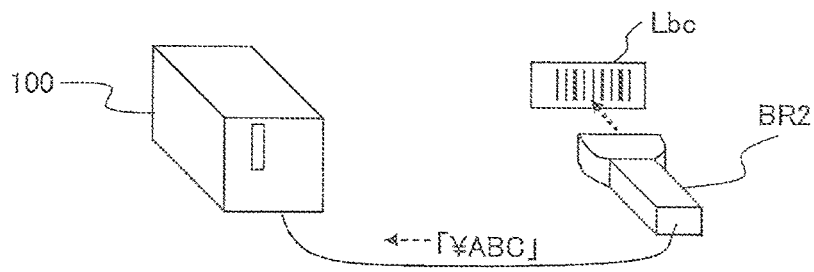
Figure 7D:
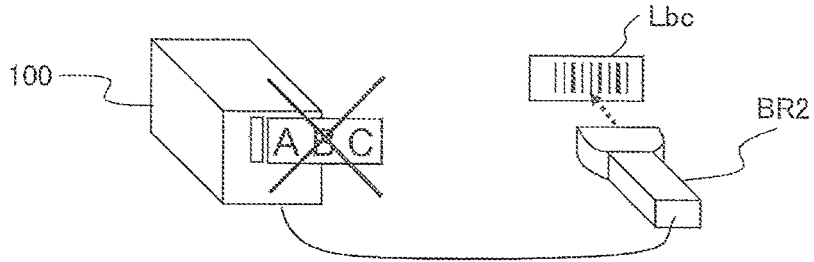

FIGS. 7A and 7B illustrate operations for creating the printed label L by using scanning of a bar-code reader BR1. FIGS. 7C and 7D illustrate a malfunction which may be caused in the case where the bar-code reader BR1 is replaced with a new bar-code reader BR2, and the bar-code reader BR2 is connected to the label printer 100.

As illustrated in FIG. 7A, when a bar code printed on a bar-code label Lbc, or a bar code displayed on a screen of a display such as an LCD is read by the bar-code reader BR1 having already been connected to the label printer 100, for example, the read bar-code information (as one example of read information corresponding to a text, an image, or the like) is transmitted to the label printer 100. In response, as illustrated in FIG. 7B, the label printer 100 prints the print object, such as a text or an image, on the cover film 411 based on the transmitted bar-code information to create the printed label L. FIGS. 7A and 7B illustrate an example in which a text "ABC" is printed on the bar-code label Lbc as the bar-code information, and the label printer 100 having received text data has created the printed label L with the text "ABC" formed thereon.

In transmission and reception of the bar-code information in FIGS. 7A and 7B, the same communication type for transfer of the bar-code information is determined in advance for the bar-code reader BR1 and the label printer 100. Here, the example in FIG. 7A illustrates a communication type in which the prefix "$" needs to be added to the beginning of data, and the bar-code information is transferred in the form "prefix+data". Thus, in response to the read text data "ABC" as the read bar-code information, the bar-code reader BR transmits data "$ABC", constituted by the prefix and the data, to the label printer 100 according to the communication type. Upon receiving the data "$ABC", the label printer 100 decodes the prefix according to the communication type to decompress the text data "ABC" to create the printed label L with the text "ABC" formed thereon.

Here, the bar-code reader BR1 may be replaced with a new bar-code reader BR2 in the case where there is a failure in the bar-code reader BR1 having been connected to the label printer 100, or in the case where a new product is released, for example.

While the prefix "$" is set to be added to the beginning of the bar-code information according to the communication type of the label printer 100, as illustrated in FIG. 7C, it is assumed that the prefix "¥" is set to be added to the beginning of the bar-code information according to a communication type of the new bar-code reader BR2. In this case, the bar-code reader BR transmits data "¥ABC" as illustrated in FIG. 7C, but as illustrated in FIG. 7D the label printer 100 cannot interpret the information and cannot create the printed label L with the text "ABC" formed thereon.

To solve a malfunction which may be caused when the bar-code reader BR is replaced or newly connected, the same communication type as set to the label printer 100 needs to be set to the new bar-code reader BR2. A processing for setting this communication type may be referred to as "handshake processing" or "initial-setting processing".

In a conventional technique, the initial-setting processing is executed by operating a new bar-code reader to read a prepared setting bar code. FIGS. 8-11 illustrate one example of a plurality of communication setting items each containing a prepared setting bar code (as one example of a setting code) and its written explanation, for example.

Figure 8:
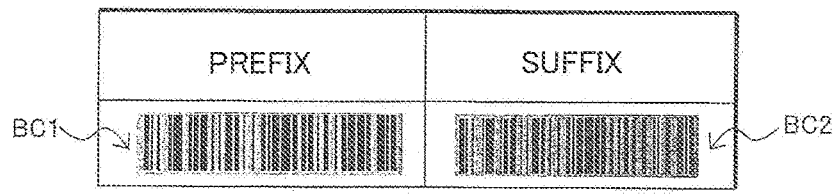
FIG. 8 is a view for explaining initial setting for the bar-code reader in a conventional technique.
Figure 9:
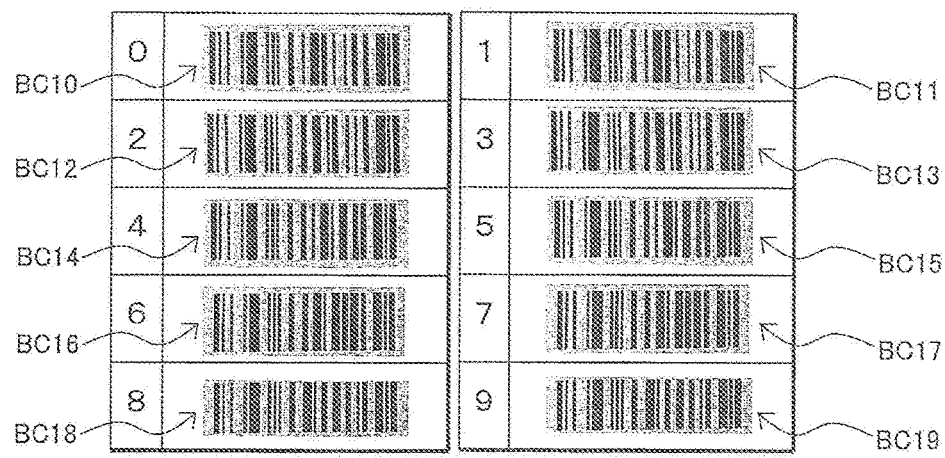
FIG. 9 is a view for explaining initial setting for the bar-code reader in the conventional technique.
Figure 10:
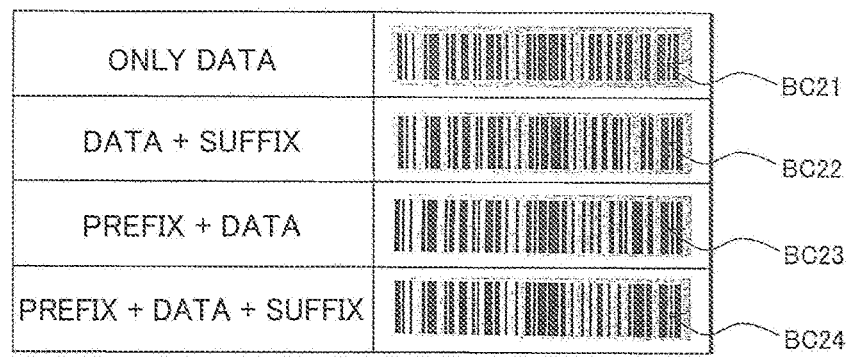
FIG. 10 is a view for explaining initial setting for the bar-code reader in the conventional technique.

FIG. 8 illustrates one example of a setting table for setting a prefix and a suffix. It is noted that the prefix is information added to the beginning of data, and the suffix is information added to the end of data. A bar code BC1 represents designation of a prefix, and a bar code BC2 represents designation of a suffix. FIG. 9 illustrates one example of a conversion table for inputting a number. A bar code BC10 represents "0". A bar code BC11 represents "1". A bar code BC12 represents "2". A bar code BC13 represents "3". A bar code BC14 represents "4". A bar code BC15 represents "5". A bar code BC16 represents "6". A bar code BC17 represents "7". A bar code BC18 represents "8". A bar code BC19 represents "9". FIG. 10 illustrates one example of a setting table for selecting the communication type. A bar-code reader BC21 represents "only data". A bar code BC22 represents "data+suffix". A bar code BC23 represents "prefix+data". A bar code 24 represents "prefix+data+suffix". FIG. 11 illustrates one example of a conversion table representing a conversion between information designated as a prefix or a suffix, and a setting value for designating the information. That is, the prefix or the suffix "$" corresponds to a setting value "1036", for example.

These setting bar codes and their respective written explanations are one example, and there are a multiplicity of other kinds of setting information. These setting bar codes and so on are, for example, illustrated and described on each page of a thick book or scattered on a large sheet in an instruction manual or a manual. Thus, in the case where the initial-setting processing is executed for a new bar-code reader BR2, a user in the conventional technique needs to understand the manual or the like, select necessary bar codes from scattered setting tables, and operate the bar-code reader BR2 to read a plurality of bar codes with the utmost caution so as not to make a mistake in the determined order. Accordingly, the user has to perform complicated and laborious operations in the initial-setting processing.

To solve a malfunction illustrated in FIGS. 7C and 7D, the prefix "$" as in FIGS. 7A and 7B needs to be set for a new bar-code reader BR2, for example. In this case, the user reads a manual and operates the bar-code reader BR2 to read the bar code BC1 in FIG. 8 (prefix designation) to set a prefix, for example. The user then searches for the table in FIG. 11 in the manual and specifies that the mark "$" corresponds to the value "1036". The user then carefully operates the bar-code reader BR2 to read the bar code BC11, the bar code BC10, the bar code BC13, and the bar code BC16 on the conversion table illustrated in FIG. 9 in this order to input the value "1036". The user finally operates the bar-code reader BR2 to read the bar code BC23 on the setting table illustrated in FIG. 10 to designate the communication type "prefix+data". In the conventional technique, this series of operations need to be performed to execute the initial-setting processing.

Initial Setting in Embodiment

In the label printer 100 according to the present embodiment, in contrast, the memory 447 stores setting information about the bar-code reader BR1, and when the label printer 100 detects that a new bar-code reader BR2 is connected to the label printer 100, the label printer 100 prints a setting bar code related to the setting information (noted that the setting information may be obtained by the label printer 100 from the bar-code reader BR1 and stored into the memory 447). This configuration enables the user to perform initial setting only by operating the new bar-code reader BR2 to sequentially scan and read the setting bar codes printed by the label printer 100. Accordingly, the user can reliably scan proper bar codes in the proper order without mixing up bar codes to be scanned or making a mistake in the scanning order, resulting in easy initial setting. There will be described this initial setting in detail with reference to FIGS. 12-14.

Figure 12:
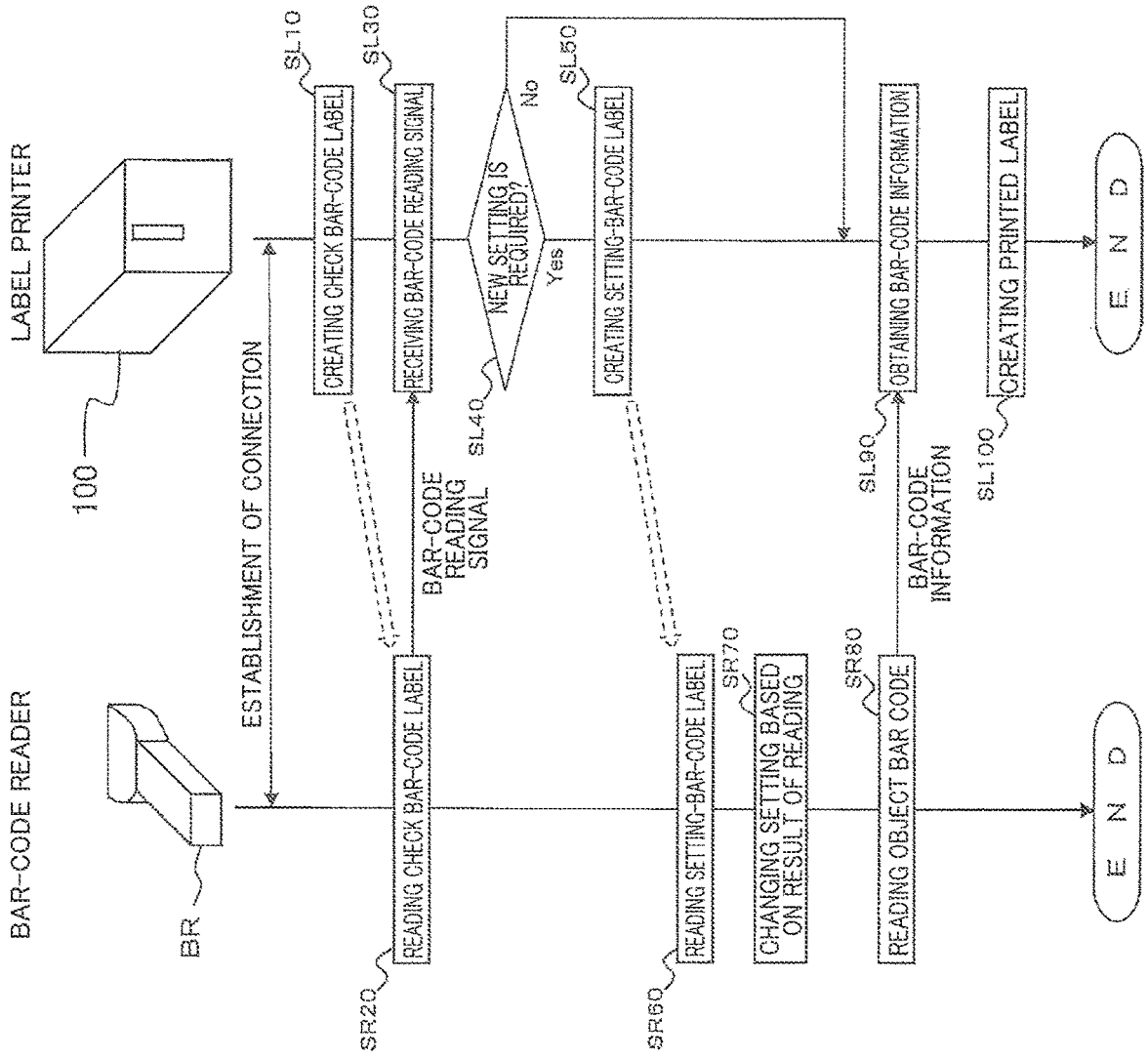
FIG. 12 is a view for explaining procedures of operations of the label printer and the bar-code reader.

FIG. 12 represents flows of processings including the initial setting. FIG. 13 conceptually illustrates operations in the flow. FIG. 14 represents a setting-bar-code label printed in the initial setting in the present embodiment.

As illustrated in the flows in FIG. 12, in the initial setting and the subsequent printed-label creating process between the label printer 100 and the bar-code reader BR (e.g., a new bar-code reader BR2), the control circuit 440 of the label printer 100 executes a check-bar-code-label creating processing SL10 (as one example of a check-code-printed-material creating processing), a bar-code-reading-signal receiving processing SL30 (as one example of a read-information obtaining processing), a setting determining processing SL40, a setting-bar-code-label creating processing SL50 (as one example of a setting-code-printed-material creating processing), a bar-code-information obtaining processing SL90 (as one example of a setting-code-information obtaining processing), and a printed-label creating processing SL100 (as one example of an object-printed-material creating processing). The bar-code reader BR executes a check-bar-code-label reading processing SR20, a setting-bar-code-label reading processing SL60, a setting changing processing SR70 related to a result of reading, and an object-bar-code reading processing SR80.

Setting Processing in Embodiment

In the label printer 100 according to the present embodiment, as described above, the memory 447 stores the predetermined setting information about the bar-code reader BR. Examples of the predetermined setting information include: setting information created by initial setting between the label printer 100 and the bar-code reader BR1 before replacement, and print objects for setting which are required for a series of processings, which will be described below, and which are to be printed on a check bar-code label (as one example of a check-code printed material) and the setting-bar-code label. In the present embodiment, as setting information set for the memory 447 (as one example of setting information), the memory 447 stores a communication type in which the prefix "$" is necessarily added to the beginning of data, and data is transmitted in the form "prefix+data". That is, the setting information stored in the memory 447 includes at least information indicating a communication type used when communication is performed from the bar-code reader BR to the label printer 100 in a state in which the USB cable 9 is connected to the USB connector 103.

Figure 13A:
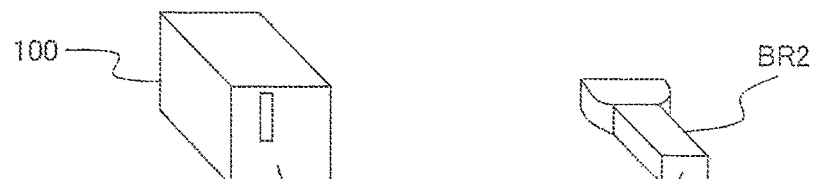
FIGS. 13A through 13G are conceptual views representing operations of the label printer and the bar-code reader.
Figure 14:
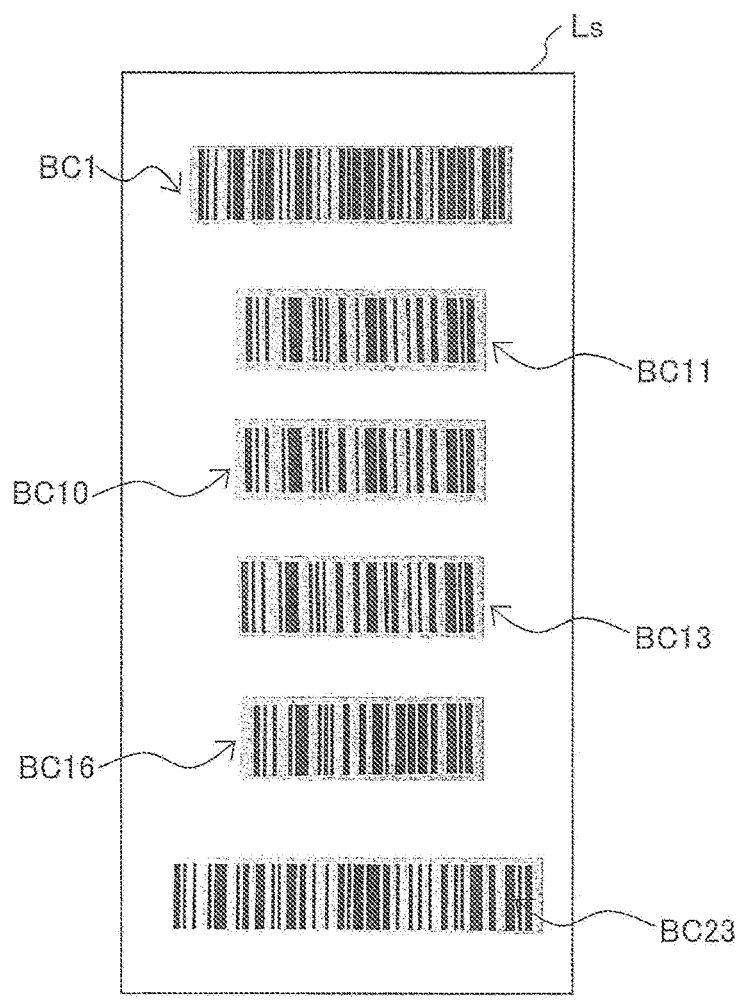
FIG. 14 is a view for explaining initial setting for the bar-code reader in the label printer.
Figure 15A:
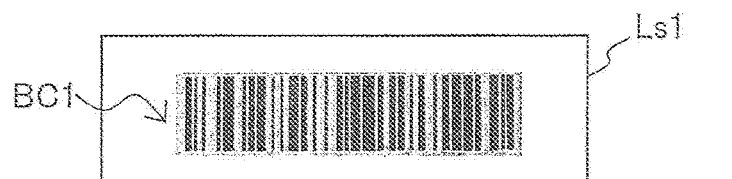
FIGS. 15A through 15F are views for explaining initial setting for the bar-code reader in a label printer according to a first modification.
Figure 15B:
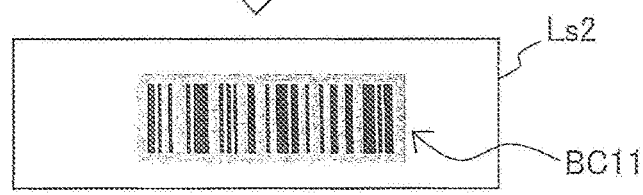
Figure 15C:
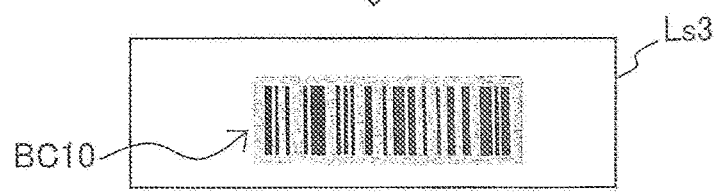
Figure 15D:
Figure 15E:
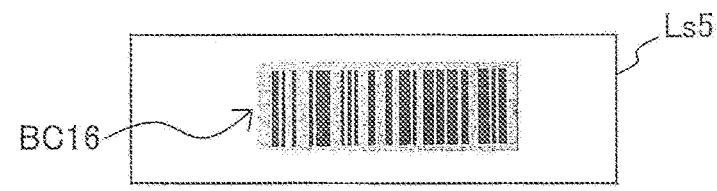
Figure 15F:
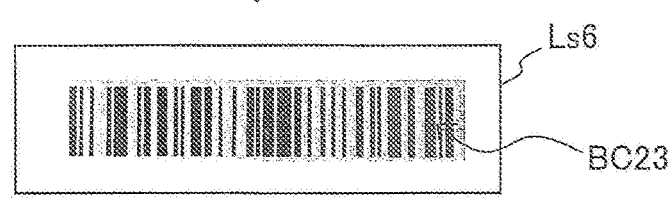

As illustrated in FIGS. 12 and 13A, when a new bar-code reader BR (e.g., the bar-code reader BR2) is connected to the label printer 100 via the USB cable 9 and the USB connector 103, a connected state is established. In response, the check-bar-code-label creating processing SL10 is executed. That is, the control circuit 440 executes the check-bar-code-label creating processing SL10 when the USB cable 9 is connected to the USB connector 103, and thereby the bar-code reader BR is connected to the label printer 100 via the USB cable 9.

Figure 13B:
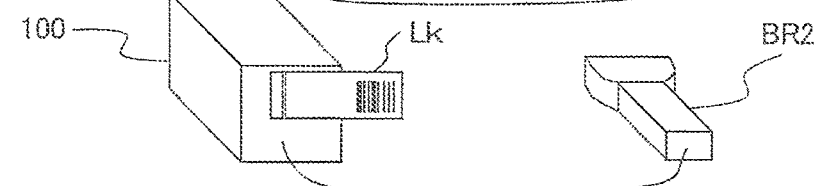

In the check-bar-code-label creating processing SL10, as illustrated in FIG. 13B, when the bar-code reader BR is connected to the label printer 100 via the USB cable 9 inserted in the USB connector 103, the control circuit 440 controls the elements including the tape-conveying-roller drive shaft 430 and the print head 419 to create a check bar-code label Lk (as another example of the check-code printed material) formed with a check bar code stored in the memory 447 in advance. The check bar code is a print object for checking a setting state of the bar-code reader BR. The check bar code is used for checking whether communication data can be interpreted in the label printer 100. That is, the check bar-code label Lk is a printed material formed with at least one check bar code readable by the bar-code reader BR connected to the label printer 100. In the present embodiment, as illustrated in FIG. 13B, it is assumed that the check bar code means "AAA" as a text, for example. After the check bar-code label Lk is created, the label printer 100 executes the check-bar-code-label reading processing SR20.

Figure 13C:
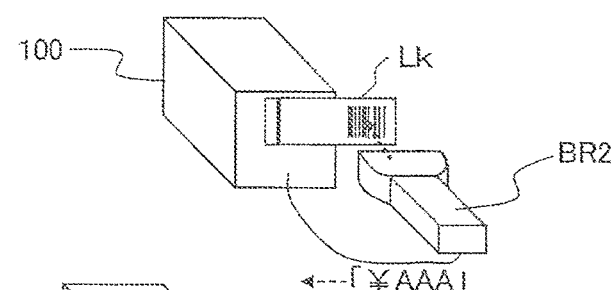

In the check-bar-code-label reading processing SR20, as illustrated in FIG. 13C, the user operates the bar-code reader BR to read the check bar code printed on the check bar-code label Lk. The bar-code reader BR transmits a bar-code reading signal (as one example of read information) to the label printer 100 in the communication type set currently. In the present embodiment, FIG. 13C illustrates a case where "prefix+data" is set as a communication type, and "¥" is set as a prefix in the bar-code reader BR. After the check bar-code label Lk is read, the label printer 100 executes the bar-code-reading-signal receiving processing SL30.

In the bar-code-reading-signal receiving processing SL30, the control circuit 440 receives, from the bar-code reader BR, the bar-code reading signal related to a result of the reading of the check bar code printed on the check bar-code label Lk. The label printer 100 thereafter executes the setting determining processing SL40.

In the setting determining processing SL40, the control circuit 440 determines, based on the received bar-code reading signal, whether new setting for the bar-code reader BR is required. For example, in the case where setting for the bar-code reader BR is correct, the control circuit 440 can correctly interpret (e.g., decode or decrypt) the bar-code reading signal transmitted from the bar-code reader BR and determines that the received bar-code reading signal matches the print object printed on the check bar code created in the check-bar-code-label creating processing SL10. Thus, in this case, the control circuit 440 determines that new setting for the bar-code reader BR is not required, and executes the bar-code-information obtaining processing SL90. In the case where setting for the bar-code reader BR is not correct, the control circuit 440 cannot interpret the bar-code reading signal correctly and does not determine that the bar-code reading signal matches the print object. Thus, in this case, the control circuit 440 determines that new setting is required and executes the setting-bar-code-label creating processing SL50.

It is noted that the check-bar-code-label creating processing SL10 and the setting determining processing SL40 are executed to determine whether initial setting is required for the bar-code reader BR newly connected to the label printer 100. Thus, in the case where it is obvious that initial setting is required, for example, in the case where connection between the label printer 100 and a new bar-code reader BR is established or in the case where a predetermined operation is performed by the user, the control circuit 440 may immediately execute the setting-bar-code-label creating processing SL50. That is, the control circuit 440 may execute the setting-bar-code-label creating processing SL50 when the bar-code reader BR is newly connected to the label printer 100 via the USB cable 9.

Figure 13D:
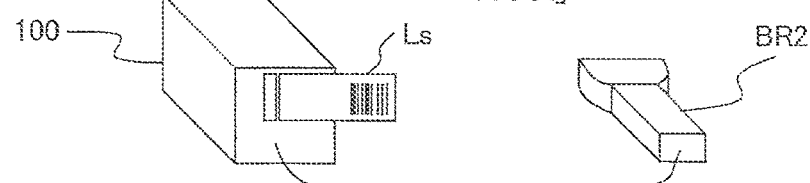

In the setting-bar-code-label creating processing SL50 (as one example of the setting-code-printed-material creating processing), as illustrated in FIG. 13D, the control circuit 440 controls the devices including the tape-conveying-roller drive shaft 430 and the print head 419 to create a setting-bar-code label Ls (as one example of a setting-code printed material) printed with the setting bar codes (as one example of the setting code) stored in the memory 447 in advance. Each of the setting bar codes is a print object representing corresponding setting information on the bar-code reader BR.

In the present embodiment, the setting information includes a plurality of communication setting items relating to communication from the bar-code reader BR to the control circuit 440. The setting-bar-code label Ls in the present embodiment contains a plurality of the setting bar codes corresponding to the respective communication setting items. FIG. 14 illustrates one example of the setting-bar-code label Ls in the present embodiment.

As illustrated in FIG. 14, the bar codes BC read in initial setting for the bar-code reader BR2, which is explained with reference to FIGS. 7A-7D, are printed on the setting-bar-code label Ls in the present embodiment in the order in which the bar codes BC are to be read. That is, the bar code BC1, the bar code BC11, the bar code BC10, the bar code BC13, the bar code BC16, and the bar code BC23 are printed on the setting-bar-code label Ls in this order. While the bar codes are arranged in parallel in FIG. 14, the arrangement of the bar codes is not limited in particular, and the bar codes may be arranged in line.

The bar code BC1 (as one example of a first setting code) represents designation of a prefix (as one example of a first communication setting item). The bar code BC11 (as one example of a second setting code), the bar code BC10, the bar code BC13, and the bar code BC16 respectively represent "1" (as one example of a second communication setting item), "0", "3", and "6" and represent a value "1036" corresponding to "$" as a whole. The bar code BC23 represents designation of the communication type "prefix+data". Thus, the setting-bar-code label Ls in the present embodiment contains at least one of a prefix setting (the bar code BC1) and a suffix setting (the bar code BC2) as the plurality of communication setting items. After the setting-bar-code label Ls is created, the bar-code reader BR executes the setting-bar-code-label reading processing SR60.

Figure 13E:
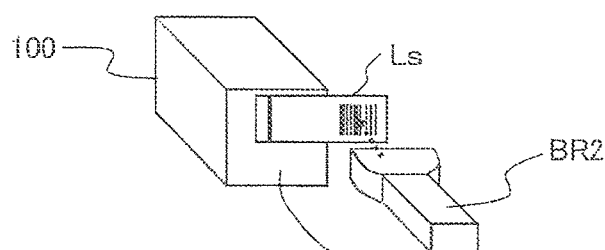

In the setting-bar-code-label reading processing SR60, as illustrated in FIG. 13E, the user operates the bar-code reader BR to read the setting bar codes printed on the setting-bar-code label Ls in order. After the setting-bar-code label Ls is read, the bar-code reader BR executes the setting changing processing SR70 related to the result of reading.

In the setting changing processing SR70 related to the result of reading, the bar-code reader BR executes initial setting of the communication type according to the setting bar codes read in the setting-bar-code-label reading processing SR60, i.e., the setting information. In the case of the setting-bar-code label Ls illustrated in FIG. 14, the bar-code reader BR sets "prefix+data" as a communication type and sets "$" as a prefix. After the initial-setting processing is executed, the bar-code reader BR executes the object-bar-code reading processing SR80. It is noted that the initial-setting processing for a new bar-code reader BR is finished by the setting changing processing SR70 related to the result of reading. Objects read using the bar-code reader BR for which initial setting is finished are thereafter printed as needed.

Figure 13F:
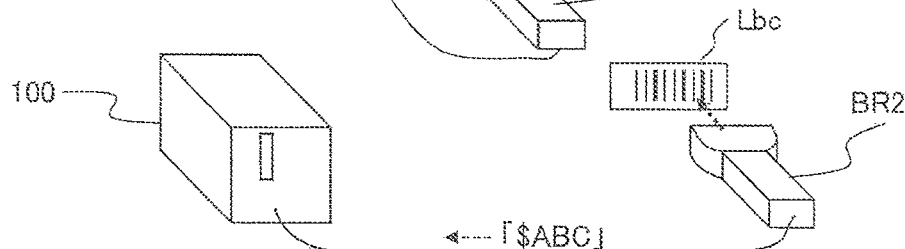

In the object-bar-code reading processing SR80, as illustrated in FIG. 13F, the user operates the bar-code reader BR to read the bar-code label Lbc on which a bar code corresponding to a print object is formed. Examples of the print object include a text and an image. In the present embodiment, the text "ABC" is used as the print object. After the bar code is read, the label printer 100 executes the bar-code-information obtaining processing SL90.

In the bar-code-information obtaining processing SL90, the control circuit 440 obtains bar-code information corresponding to a result of reading of the bar code. In this operation, the bar-code information is transmitted from the bar-code reader BR that has read the setting bar codes printed on the created setting-bar-code label Ls to perform setting corresponding to the setting information. Thus, the same communication type is set for the label printer 100 and the bar-code reader BR, and bar-code information decodable in the label printer 100 is transmitted from the bar-code reader BR and received by the control circuit 440 of the label printer 100. FIG. 13F illustrates one example in which the bar-code information "$ABC" is obtained. After the bar-code-information obtaining processing SL90 is executed, the label printer 100 executes the printed-label creating processing SL100.

Figure 13G:
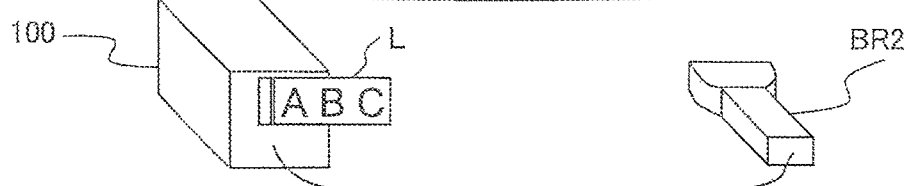

In the printed-label creating processing SL100 (as one example of the object-printed-material creating processing), as illustrated in FIG. 13G, the control circuit 440 controls the devices including the tape-conveying-roller drive shaft 430 and the print head 419 in accordance with the obtained bar-code information and creates the printed label L on which a corresponding print object (the text "ABC" in the present embodiment) is printed.

Effects in Embodiment

The label printer 100 according to the present embodiment has been explained above. In the present embodiment, the USB cable 9 connectable to the USB connector 103 of the label printer 100 connects between the label printer 100 and the bar-code reader BR. The label printer 100 creates the printed label L in accordance with a result of reading of the bar codes BC by the bar-code reader BR. With this configuration, in the case where the bar-code reader BR is replaced due to malfunction or replaced with a bar-code reader BR of a new model, for example, setting needs to be performed to make a newly-connected bar-code reader BR2 usable in the same manner as in the replaced bar-code reader BR1. In the present embodiment, the memory 447 stores the predetermined setting information for the settings. In the setting-bar-code-label creating processing SL50 executed by the control circuit 440, the setting bar codes representing the stored setting information are formed in the cover film 411 to create the setting-bar-code label Ls.

The new bar-code reader BR (e.g., the bar-code reader BR2) reads setting bar codes printed on the created setting-bar-code label Ls to change various settings for the bar-code reader BR to settings corresponding to the above-described setting information. It is noted that in the case where the label printer 100 includes a display screen of the LCD, for example, the setting bar codes corresponding to the created setting-bar-code label Ls may be displayed on the display screen. In this case, the bar-code reader BR2 only has to read the setting bar codes displayed on the display screen. With this configuration, the new bar-code reader BR (e.g., the bar-code reader BR2) for which initial setting is performed can be used in the same manner as in the replaced bar-code reader BR (e.g., the bar-code reader BR1).

That is, in the bar-code-information obtaining processing SL90 executed by the control circuit 440, the control circuit 440 obtains the bar-code information corresponding to a result of reading of a bar code BC by the new bar-code reader BR. Thereafter, in the printed-label creating processing SL100, the label printer 100 creates the printed label L with a print object related to the bar-code information.

In the present embodiment, as described above, various settings for the bar-code reader BR newly connected to the label printer 100 can be performed speedily and easily only by reading the setting bar codes printed on the setting-bar-code label Ls created by the label printer 100. This reduces a burden on the user and improves the convenience to the user when compared with the conventional technique in which the user needs to select necessary bar codes from among the multiplicity of bar codes described in list form and then operate the bar-code reader BR to read the selected bar code in the predetermined order, for example.

In the present embodiment, the control circuit 440 executes the check-bar-code-label creating processing SL10, the bar-code-reading-signal receiving processing SL30, and the setting determining processing SL40. As a result, the setting-bar-code-label creating processing SL50 is executed in the case where the control circuit 440 in the setting determining processing SL40 determines that new setting is required. With this configuration, the control circuit 440 can check whether the bar-code reader BR newly connected is set so as to be used in the same manner as in the replaced bar-code reader BR, and when the bar-code reader BR newly connected is not set so as to be used in the same manner, it is possible to change the settings of the bar-code reader BR newly connected, such that the bar-code reader BR is set so as to be used in the same manner as in the replaced bar-code reader BR.

In the present embodiment, the setting information includes a plurality of the communication setting items relating to communication from the bar-code reader BR to the control circuit 440. In the setting-bar-code-label creating processing SL50, the label printer 100 creates one setting-bar-code label Ls printed with a plurality of the setting bar codes (e.g., the bar codes BC1, BC11, BC10, BC13, BC16, BC23) corresponding to the respective communication setting items. Thus, the one setting-bar-code label Ls is created in the setting-bar-code-label creating processing SL50, and all the setting bar codes corresponding to the respective communication setting items are formed on the one setting-bar-code label Ls. This configuration enables the user to easily perform settings for all the required communication setting items by operating the bar-code reader BR to sequentially read the setting bar codes formed on the created one setting-bar-code label Ls, for example. Since all the setting bar codes are formed on the one setting-bar-code label Ls, it is possible to prevent omissions in the reading of the setting bar codes.

In the present embodiment, the communication setting items include at least one of the prefix setting (e.g., the bar code BC1) and the suffix setting (e.g., the bar code BC2). With this configuration, when data communication of a reading result is performed from the bar-code reader BR to the label printer 100, setting for the bar-code reader can be changed such that the data communication is performed with the added prefix and/or suffix according to the predetermined communication standard.

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, in the above-described embodiment, as illustrated in FIG. 14, the setting bar codes corresponding to the respective communication setting items are formed on one setting-bar-code label Ls, but the present disclosure is not limited to this configuration. There will be described a modification for creating the setting-bar-code label Ls, with reference to FIGS. 15A-16F.

First Modification

There will be described a first modification with reference to FIGS. 15A-15F. In this modification, in the setting-bar-code-label creating processing SL50, the control circuit 440 sequentially creates, in a particular order, a plurality of setting-bar-code labels Ls1-Ls6 printed respectively with setting bar codes (i.e., the bar codes BC1, BC11, BC10, BC13, BC16, BC23) corresponding respectively to communication setting items.

That is, in the example illustrated in FIG. 15A-15F, the label printer 100 creates the setting-bar-code label Ls1 with the bar code BC1, the setting-bar-code label Ls2 with the bar code BC11, the setting-bar-code label Ls3 with the bar code BC10, the setting-bar-code label Ls4 with the bar code BC13, the setting-bar-code label Ls5 with the bar code BC16, and the setting-bar-code label Ls6 with the bar code BC23, in this order so as to correspond to the setting-bar-code label Ls illustrated in FIG. 14. In this operation, the setting-bar-code labels Ls1-Ls6 may be automatically and sequentially created at intervals of a predetermined length of time (e.g., five seconds).

In the present modification, the setting-bar-code labels Ls1-Ls6 are sequentially created in the particular order in the setting-bar-code-label creating processing SL50, and the setting bar codes (i.e., the bar codes BC1, BC11, BC10, BC13, BC16, BC23) corresponding to the respective communication setting items are formed on the respective bar-code labels Ls1-Ls6. This configuration enables the user to easily perform settings for all the required communication setting items by operating the bar-code reader BR to read the setting bar codes printed on the respective sequentially-created setting-bar-code labels Ls1-Ls6, in the order of the creation. Since one setting bar code is formed for each of the sequentially-created setting-bar-code labels Ls1-Ls6, the user can operate the bar-code reader BR to read the setting bar codes in the proper order, thereby preventing a mistake with the order.

Second Modification

There will be described a second modification with reference to FIGS. 16A-16F. In this modification, as in the first modification, the control circuit 440 sequentially creates, in a particular order, a plurality of setting-bar-code labels Ls1-Ls6 printed respectively with setting bar codes corresponding respectively to communication setting items. In the first modification, the plurality of setting-bar-code labels Ls1-Ls6 are automatically created at intervals of the predetermined length of time. In the present modification, in contrast, each time when reading of a single setting bar code is finished, an instruction (hereinafter may be referred to as "creation-start instruction") for starting creation of the next setting-bar-code label Ls is input to the label printer 100 to create the plurality of setting-bar-code labels Ls1-Ls6 sequentially in the particular order.

In the present modification, as illustrated in FIGS. 16A-16E, each of the setting-bar-code labels Ls1-Ls5 is printed with not only one setting bar code but also an instruction bar code BCn for instructing a start of creation of the next setting bar code. The user operates the bar-code reader BR to read a setting bar code (e.g., the bar code BC11) formed on a setting-bar-code label Ls (e.g., the setting-bar-code label Ls2) created most recently and then read the instruction bar code BCn formed on the same setting-bar-code label Ls. In response, the creation-start instruction for instructing a start of creation of the next setting-bar-code label (e.g., the setting-bar-code label Ls3) represented by the instruction bar code BCn is transmitted from the bar-code reader BR to the label printer 100. Upon receiving the creation-start instruction, the label printer 100 creates the setting-bar-code label on which the next setting bar code is printed.

Thus, in the present modification, not only the setting bar code but also the instruction bar code BCn is formed on each of the setting-bar-code labels Ls1-Ls5 created sequentially. Accordingly, after the completion of reading of the setting bar code formed on one of the setting-bar-code labels Ls1-Ls5, when the instruction bar code BCn is read, the label printer 100 can create the next one of the setting-bar-code labels Ls1-Ls5. This configuration enables the user to freely control the timings of printing of the setting-bar-code labels Ls1-Ls5, resulting in improved convenience to the user.

When transmitting the creation-start instruction, initial setting of the communication type for the bar-code reader BR has not been completed, but data for the creation-start instruction requires a small amount when compared with the bar-code information such as the print object. Thus, the creation-start instruction is preferably transmitted from the label printer 100 not in communication for data transfer used for transmitting the bar-code information, but in simple communication that does not require determination of the communication type between the label printer 100 and the bar-code reader BR. This simple communication may adhere to any communication standard as long as the label printer 100 can interpret the creation-start instruction. One example of the communication standard is a communication standard for transferring a command.

Figure 16A:
FIGS. 16A through 16F are views for explaining initial setting for the bar-code reader in a label printer according to a second modification.
Figure 16B:
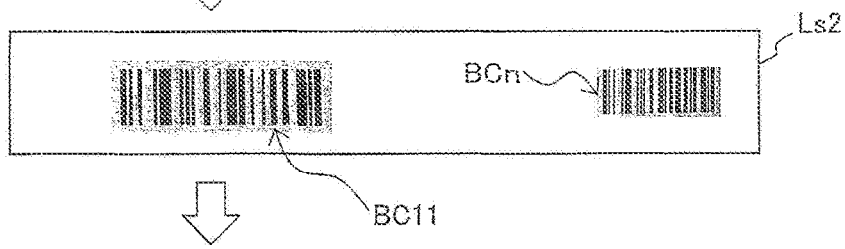
Figure 16C:
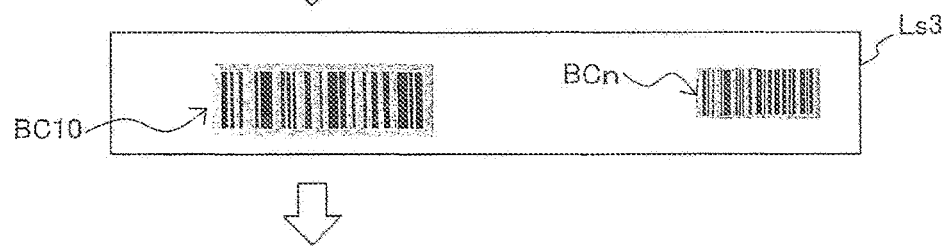
Figure 16D:
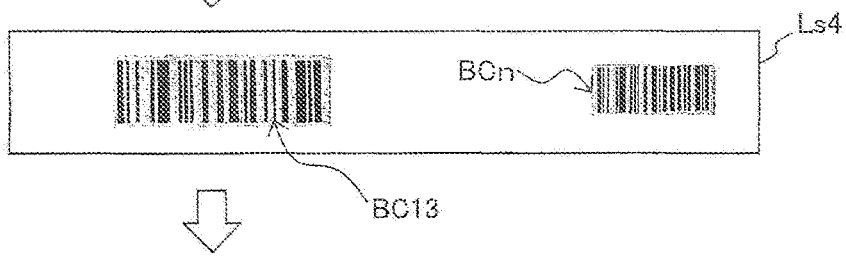
Figure 16E:
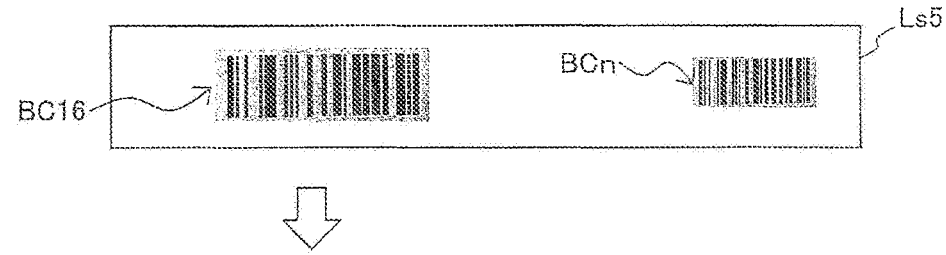
Figure 16F:
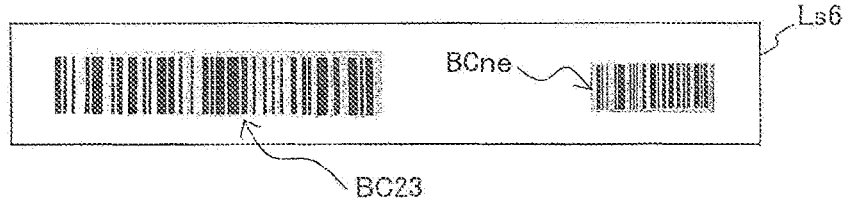

As illustrated in FIG. 16F, the setting-bar-code label Ls6 is printed with not only one setting bar code but also a final bar code BCne for checking whether settings have been performed correctly. The user, for example, operates the bar-code reader BR to read the bar code BC23 formed on the setting-bar-code label Ls6 created last and then read the final bar code BCne formed on the same setting-bar-code label Ls6. In response, a setting-end instruction represented by the final bar code BCne for finishing setting of the setting-bar-code labels is transmitted from the bar-code reader BR to the label printer 100. Upon receiving the setting-end instruction, the label printer 100 determines whether setting of the setting-bar-code labels is completed.

Third Modification

In the above-described embodiment, the first modification, and the second modification, as described above, the communication type is set for the bar-code reader BR by processings including the setting-bar-code-label creating processing SL50. However, use of these processings including the setting-bar-code-label creating processing SL50 is not limited to setting for the communication type and may be used for setting for reading performance of the bar-code reader BR.

In the present modification, the setting information includes a reading-setting item (as one example of a third communication setting item) relating to bar-code reading performance of the bar-code reader BR. In the setting-bar-code-label creating processing SL50, the control circuit 440 creates the setting-bar-code label Ls formed with a setting bar code (as one example of a third setting code), not illustrated, corresponding to the reading-setting item. The user operates the bar-code reader BR to read the setting bar code corresponding to the reading-setting item. The bar-code reader BR reflects the reading-setting item in a reading setting of the bar-code reader BR. Examples of the reading-setting item include a resolution, performance of recognition of the density level, and performance of recognition of a distance between bars of the bar code. In this modification, the reading performance of the bar-code reader BR (e.g., the bar-code reader BR2) newly connected to the label printer 100 can be made similar to that of the replaced bar-code reader BR (e.g., the bar-code reader BR1).

Others

In the above-described description, each of the wordings "orthogonal", "parallel", "planar", and so on is not used in a strict sense. That is, tolerance and error in designing and manufacturing are allowed for these wordings, and the wordings "orthogonal", "parallel", "planar", and so on respectively mean "substantially orthogonal", "substantially parallel", "substantially planar", and so on.

While the terms "the same", "equal", "different", and the like may be used for dimensions and sizes in external appearance and signal processing in the above-described description, these terms are not strictly used. That is, tolerance, error, changes, variations, and the like in design and manufacture are allowed, and "same", "equal", and "different" may be respectively interpreted as "substantially the same", "substantially equal", and "substantially different".

Each arrow in FIG. 4 indicates one example of a flow of signals and does not limit a direction or directions of the flow of the signals.

Processings achieved by the present disclosure are not limited to the flows illustrated in FIG. 12. The processings may be added, removed, altered, combined, and reordered without departing from the spirit of the scope of the present disclosure.

The techniques in the above-described embodiment and modifications may be used in any combinations.

The disclosure is not limited to the details of the illustrated embodiment and modifications, but may be embodied with various changes and modifications, which may occur to those skilled in the art, without departing from the spirit and scope of the disclosure. For example, the label printer 100 is connected to the bar-code reader BR configured to read the bar code BC in the above-described embodiment but may be connected to a code reader capable of reading any code such as a two-dimensional code different from the bar code BC. For example, in FIG. 14, the label printer 100 may create at least one two-dimensional code as a setting-code label (as another example of the setting-code printed material) in the setting-bar-code-label creating processing SL50 (as one example of the setting-code-printed-material creating processing).

What is claimed is:

1. A printing apparatus, comprising:
    a conveyor configured to convey a printing medium;
    a printing device configured to perform printing on the printing medium conveyed by the conveyor;
    a connector configured to accept a connecting cable connectable to a code reader, such that the connecting cable is removable from the connector;
    a storage configured to store setting information indicating a setting of the code reader; and
    a controller configured to control the conveyor and the printing device,
    the controller being configured to execute a setting-code-printed-material creating processing in which the controller controls the conveyor and the printing device to create a setting-code printed material by printing a setting code corresponding to the setting information stored in the storage, on the printing medium,
    wherein the controller is configured to, when connection of the code reader to the printing apparatus via the connecting cable is established, execute a check-code-printed-material creating processing in which the controller controls the conveyor and the printing device to create a check-code printed material by printing, on the printing medium, at least one reading code readable by the code reader being in connection with the printing apparatus.

2. The printing apparatus according to claim 1, wherein the controller is configured to execute:
    a setting-code-information obtaining processing in which the controller obtains read information from the code reader having read the setting code formed on the created setting-code printed material and having made a change in a setting of the code reader to the setting corresponding to the setting information, the read information being information created by the code reader by reading a code formed on a printed material different from the setting-code printed material; and
    an object-printed-material creating processing in which the controller controls the conveyor and the printing device to create an object printed material by printing a print object corresponding to the obtained read information, on the printing medium.

3. The printing apparatus according to claim 1, wherein the setting information comprises information indicating a communication type that is used when the code reader communicates with the printing apparatus in a state in which the connecting cable is connected to the connector.

4. The printing apparatus according to claim 1, wherein the controller is configured to execute the setting-code-printed-material creating processing when connection of the code reader to the printing apparatus via the connecting cable is established.

5. The printing apparatus according to claim 1,
    wherein the setting information comprises a first communication setting item and a second communication setting item relating to communication of the code reader with the controller,
    wherein the setting information comprises: a first setting code corresponding to the first communication setting item; and a second setting code corresponding to the second communication setting item, and
    wherein the controller is configured to, in the setting-code-printed-material creating processing, control the conveyor and the printing device to create one setting-code printed material as the setting-code printed material by printing the first setting code and the second setting code on the printing medium.

6. The printing apparatus according to claim 5, wherein the first communication setting item comprises at least one of a prefix setting and a suffix setting.

7. The printing apparatus according to claim 1,
    wherein the setting information comprises a first communication setting item and a second communication setting item relating to communication of the code reader with the controller, wherein the setting information comprises: a first setting code corresponding to the first communication setting item; and a second setting code corresponding to the second communication setting item, and wherein the controller is configured to, in the setting-code-printed-material creating processing, control the conveyor and the printing device to sequentially create a first setting-code printed material and a second setting-code printed material in a particular order respectively by printing the first setting code on the printing medium and by printing the second setting code on the printing medium.

8. The printing apparatus according to claim 7, wherein the controller is configured to, in the setting-code-printed-material creating processing, control the conveyor and the printing device to create the first setting-code printed material by printing an instruction code on the printing medium in addition to the first setting code, and the instruction code is a code for instructing a start of creation of the second setting-code printed material.

9. The printing apparatus according to claim 1,
wherein the setting information comprises a reading-setting item relating to code reading performance of the code reader, as a third communication setting item,
wherein the setting code comprises a third setting code corresponding to the third communication setting item, and
wherein the controller is configured to, in the setting-code-printed-material creating processing, control the conveyor and the printing device to create the setting-code printed material by printing the third setting code corresponding to the reading-setting item, on the printing medium.

10. A printing apparatus, comprising:
a conveyor configured to convey a printing medium;
a printing device configured to perform printing on the printing medium conveyed by the conveyor;
a connector configured to accept a connecting cable connectable to a code reader, such that the connecting cable is removable from the connector;
a storage configured to store setting information indicating a setting of the code reader; and
a controller configured to control the conveyor and the printing device,
the controller being configured to execute a setting-code-printed-material creating processing in which the controller controls the conveyor and the printing device to create a setting-code printed material by printing a setting code corresponding to the setting information stored in the storage, on the printing medium,
wherein the controller is configured to execute:
when connection of the code reader to the printing apparatus via the connecting cable is established, a check-code-printed-material creating processing in which the controller controls the conveyor and the printing device to create a check-code printed material by printing, on the printing medium, at least one reading code readable by the code reader being in connection with the printing apparatus;
a read-information obtaining processing in which the controller obtains, from the code reader, read information that is information which the code reader being in connection with the printing apparatus has created by reading the at least one reading code formed on the check-code printed material; and
a setting determining processing in which the controller determines, based on the obtained read information, whether setting of the setting information for the code reader is required, and
wherein the controller is configured to execute the setting-code-printed-material creating processing when the controller determines in the setting determining processing that setting of the setting information is required.

11. A method of creating a printed material by a printing apparatus, the printing apparatus comprising (i) a conveyor configured to convey a printing medium, (ii) a printing device configured to perform printing on the printing medium conveyed by the conveyor, (iii) a connector configured to accept a connecting cable connectable to a code reader, such that the connecting cable is removable from the connector, and (iv) a storage configured to store setting information indicating a setting of the code reader,
the method comprising creating a setting-code printed material by printing a setting code corresponding to the setting information stored in the storage, on the printing medium and creating a check-code printed material by printing, on the printing medium, at least one reading code readable by the code reader being in connection with the printing apparatus, when connection of the code reader to the printing apparatus via the connecting cable is established.

12. The method according to claim 11, further comprising:
obtaining read information from the code reader having read the setting code formed on the created setting-code printed material and having made a change in a setting of the code reader to the setting corresponding to the setting information, the read information being information created by the code reader by reading a code formed on a printed material different from the setting-code printed material; and
creating an object printed material by printing a print object corresponding to the obtained read information, on the printing medium.

13. The method according to claim 11, wherein the setting information comprises information indicating a communication type that is used when the code reader communicates with the printing apparatus in a state in which the connecting cable is connected to the connector.

14. The method according to claim 11, further comprising causing the code reader being in connection with the printing apparatus to read the created setting-code printed material.

15. The method according to claim 11, further comprising causing the code reader being in connection with the printing apparatus to read the created check-code printed material.

16. The method according to claim 11, wherein the setting-code printed material is created when connection of the code reader to the printing apparatus via the connecting cable is established.

17. A method of creating a printed material by a printing apparatus, the printing apparatus comprising (i) a conveyor configured to convey a printing medium, (ii) a printing device configured to perform printing on the printing medium conveyed by the conveyor, (iii) a connector configured to accept a connecting cable connectable to a code reader, such that the connecting cable is removable from the connector, and (iv) a storage configured to store setting information indicating a setting of the code reader,
the method comprising:

creating a setting-code printed material by printing a setting code corresponding to the setting information stored in the storage, on the printing medium;

creating a check-code printed material by printing, on the printing medium, at least one reading code readable by the code reader being in connection with the printing apparatus, when connection of the code reader to the printing apparatus via the connecting cable is established;

obtaining, from the code reader, read information that is information which the code reader being in connection with the printing apparatus has created by reading the at least one reading code formed on the check-code printed material; and determining, based on the obtained read information, whether setting of the setting information for the code reader is required, wherein the setting-code printed material is created when it is determined that setting of the setting information is required.

\* \* \* \* \*